Feb. 2, 1954  W. H. BENDALL  2,667,792
DRIVE CHAIN

Filed Nov. 29, 1947  2 Sheets-Sheet 1

INVENTOR.
Wilfrid H Bendall

Feb. 2, 1954  W. H. BENDALL  2,667,792
DRIVE CHAIN
Filed Nov. 29, 1947  2 Sheets-Sheet 2

INVENTOR.
Wilfrid H Bendall

Patented Feb. 2, 1954

2,667,792

UNITED STATES PATENT OFFICE 2,667,792

DRIVE CHAIN

Wilfrid H. Bendall, New York, N. Y.

Application November 29, 1947, Serial No. 788,949

16 Claims. (Cl. 74—245)

This invention relates to pivoted link in drive chains for power transmission purposes and more particularly to methods of increasing their mechanical efficiency, operating speed range and horsepower transmitting capacity.

The structural design of chains widely employed for this purpose is broadly characterized by the use of a series of perforated link members, assembled with overlapping ends and registering transverse holes for pivot members, the spacing of which determines the working pitch of the chains.

The modern chain drive requirement is increasingly concerned with considerations of performance and the cost, bulk and weight of the drive components. These considerations logically postulate use of the smallest possible drive diameters and high pitch-line speeds on short drive centers, precisely the conditions presenting special difficulty for pivoted link chains.

As is well known, all such chains operate with an essentially polygonal pitch line on the drive sprockets, since the links, being rigid, cannot conform to a continuous pitch circle. The effective drive radius consequently varies as each link engages the sprocket and the links rotate into position at an appreciably increased relative velocity, striking the sprocket with an impact that increases with the square of the drive revolutions per minute and the size and mass of the links. This establishes a rotational speed limit for each size of chain beyond which it is not possible to operate with acceptable efficiency or durability. Moreover, there is a serious economic disadvantage in the fact that the chain tensile strengths and bearing capacities required for durable operation within such limits are much greater than can be effectively utilized to transmit power.

While it is recognized that certain aspects of chain action are not fully understood at this time, the general problem of chain performance has, of course, come in for a considerable amount of practical observation by those concerned with its design, manufacture and application. There appears to be general agreement with the findings of a comprehensive study of this subject which appeared a number of years ago in a paper entitled "A new basis for the rating of roller chain drives," in the 1935 Transactions of the American Society of Mechanical Engineers, by the late G. M. Bartlett, Professor of Machine Design, Purdue University, who was also consulting engineer to a prominent chain manufacturer. In this paper, after presenting an analysis of the chain action producing impact, Professor Bartlett remarks—

"There are four detrimental tendencies which result from excessive roller impact, namely, the breaking of rollers, noise, heating, and the wear of sprocket teeth. Roller breakage has been nearly eliminated by the use of better materials and proper heat treatment. Noise caused by impact has been reduced by the introduction of new designs of sprocket teeth, and can be further reduced by better lubrication and the use of short-pitch multiple-width chains. Heating is caused by wear and is always accompanied by a loss of power. Sprocket tooth-wear is the result of a continuous succession of blows administered by the rollers. This wear may be reduced in the case of the smaller sprockets by case-hardening. But assuming that reasonable attention is given to all other matters the most important consideration is that of keeping the impact per square inch of roller area within practical limits determined by experience. And this means the determination of the maximum sprocket speed to be used with a chain of a given pitch, weight and roller size."

It will be noted that the above discussion of chain impact, while not concerned with the possibility of improvement through changes in operating principle, proposes remedial measures, such as the use of short-pitch multiple-width chains, which tend to increase the cost and complexity of the drive, and tacit acceptance of roller impact as an unavoidable limiting factor. That these conditions continue to limit chain performance will be apparent from a technical paper of much later date, specifically, in the 1946 Transactions of the same society, entitled "Heavy-duty chain drives for marine propulsion service," by N. C. Bremer, the Chief Engineer of another prominent chain manufacturer, wherein the author observes—

"It must be emphasized that chain drives, unlike gears, have sharply defined upper limits of rotative speed for any given pitch. This limit is usually established by the ability of the chain roller to withstand the impact forces created by the chordal action of the chain as it engages the sprocket.

". . . the sprocket polygon causing chordal rise and fall of the chain. The practical effect of this is to create undue noise and to set up stresses in the chain which reduce materially its endurance capacity."

This paper also presents a table of chain drive horsepower ratings regarding which the author remarks—

"The load tables given in this paper are based upon a minimum working-load to chain-strength ratio of about 1 to 30. As this high factor is necessary only because of rapidly recurring dynamic loadings created by chordal action, it is obvious that the chain has an enormous capacity for resisting momentary shocks and overloads."

While the above quotations refer specifically to the roller type chain it is well known that all pivoted link chains, including the so-called "silent chain," are subject to the same limiting characteristics and difficulties which, it will be evident, are regarded as inherent controlling factors in their application for power transmission purposes. But it is conversely evident that reduction of the effects of the "chordal action" and thus, the link rotational impact, is a fundamental requirement for improving the operation of such chains.

It is, therefore, among the major objects of the present invention to provide simple means for substantially reducing the sprocket engagement impact of pivoted link chains, to thereby enable quiet, smooth and durable operation over at least double the present speed range, and to provide these advantages in chains of standard design and construction without requiring extensive modification of the parts thereof or the customary methods of installation and use.

Objects and advantages in addition to the foregoing will be apparent to those skilled in the art from the following description and accompanying drawings in which.

Figure 1:
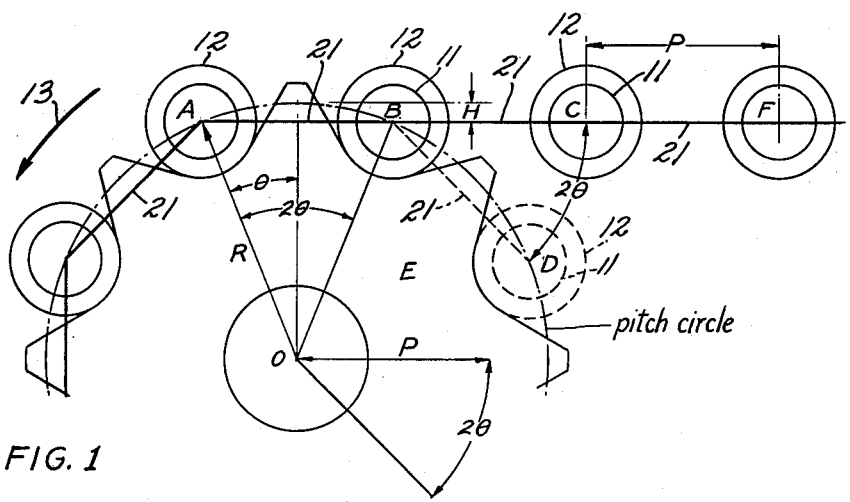
Fig. 1 is a diagram of the type used by Professor Bartlett in the abovementioned paper to illustrate the characteristic structure and the dynamics of conventional chain action, showing a chain engaging a drive sprocket.

The advancement made in the art by this invention may be more readily followed by first referring to the diagram in Fig. 1, which is substantially identical with the diagram used by Professor Bartlett in the abovementioned paper, to illustrate the conditions causing impact between chain and sprocket. The sprocket E is assumed to be rotating as indicated by the arrow 13. Rollers 12, at each end of link member 21 extending between positions A and B, have just seated on the sprocket. The centers of the link pivot members 11, coincide at A and B with the dot and dash circular line designated pitch circle, but since the link is rigid, a line through the link pivot centers becomes a chord, not an arc, of the pitch circle, subtending the latter through angle $2\theta$ at the sprocket center O. The working pitch-line of the chain on the sprocket is thus essentially polygonal and the effective drive radius fluctuates through distance H, between the side of the sprocket pitch polygon and its radius R, twice with the passage of each link. Since the line of the next link, between B and C, coincides with that of the preceding link it must evidently rotate through a similar angle $2\theta$ to engage the sprocket. In doing so it turns about the pivot center at position B at an angular speed equal to that of the sprocket, and the linear speed of the pivot center at position C, along the arc CD, relative to the sprocket, is thus equal to the linear speed of a point on the sprocket at a distance P, equal to the pitch length of the links, from center O. As shown by Bartlett, the links strike the sprocket at a speed equal to $2\pi Pn/12$ feet per minute, or $\pi Pn/360$ feet per second, where P is the link pitch length in inches, and $n$ is the revolutions per minute of the sprocket. The energy of one impact is $wv^2/2g$ foot-pounds, in which $w$ is the weight of the impinging body in pounds, $v$ the speed of the pivot center C along the arc CD in feet per second, and $g$ the acceleration of gravity.

Bartlett observes that it is uncertain how much of the mass of the chain plays a part in the impact but that it may reasonably be assumed proportional to the weight of a link and nearly equal to it. Hence, substituting $\pi Pn/360$ for $v$, and 32.2 for $g$ the energy of impact in foot-pounds is $$\frac{wv^2}{2g} = \frac{wP^2n^2}{845,617} \qquad (1)$$

where $w$ is the means weight of one pitch length of the chain. It will be seen that the destructive action is proportional to the product of the squares of the link pitch and the rotational speed. Any attempt to increase horsepower transmission by doubling the rotational speed alone, for example, quadruples the destructive effect from this cause.

It will be observed that the rise and fall of the drive strand through distance H, as each link engages, practically doubles the required link rotation in engaging the sprocket. This inherently large link rotation is seen to be a primary factor in causing destructive impact and, as stated earlier, its reduction is a fundamental requirement for improving the operation of these chains. It is accomplished in the present invention by providing the chain structure or individual link members with means, such as a mechanical spring or its equivalent arranged to initially hold the links in substantially colinear pivotal alignment with each other, so that the link rotational engagement action is opposed by an appreciable spring force.

Figure 2:
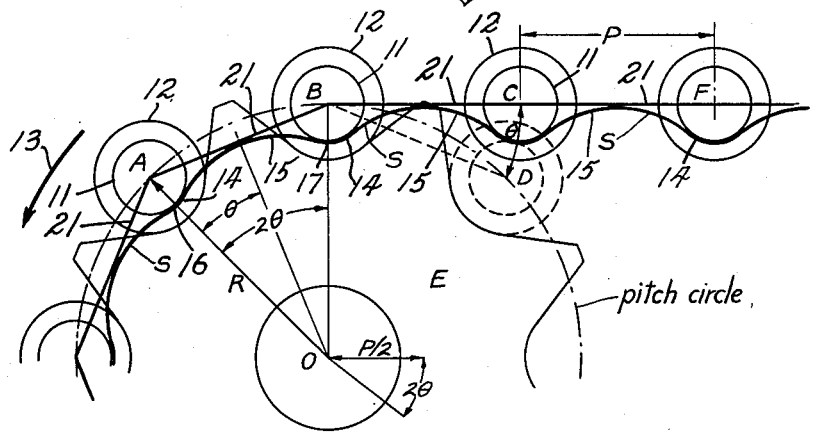
Fig. 2 is a diagram similar to Fig. 1 illustrating the modified chain structure and chain action embodying the present invention.
Figure 3:
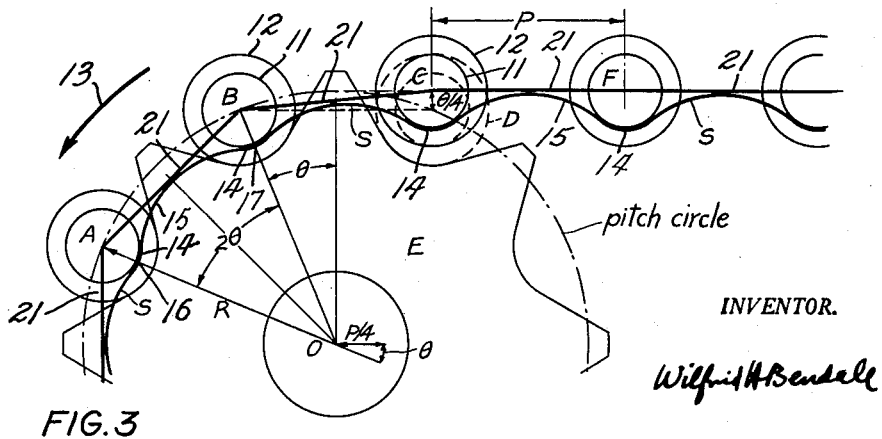
Fig. 3 is a diagram illustrating a further phase of the modified chain structure and action illustrated in Fig. 2.

This is diagrammatically illustrated in Figs. 2 and 3, where the chain of Fig. 1, is shown provided with a corrugated substantially continuous spring member designated S, having corrugation portions 14, concentric with each chain pivot member 11, alternating with corrugation portions 15, extending between the pivot members. The spring member thus described is attached to the chain in any convenient way, as, for example, by resiliently springing corrugation portions between adjacent pivot members, or by being clipped to the link members 21. This corrugated spring member may obviously be constructed in any length dictated by practical requirements and manufacturing convenience, and may alternatively comprise short, individual link spring portions assembled end to end, with abutting end portions; either arrangement constituting, in effect, a substantially continuous spring structure. It is further desirable for the purposes of this invention that the spring members thus described be constructed to initially conform to colinearly aligned chain link and pivot members, in a relatively unstressed condition. For example, it is to be understood that portions 14 and 15 of the spring members, extending along the colinear chain length BCF, in Fig. 2, initially are relatively unstressed, excluding any nominal stress involved in their attachment to the chain structure. The equivalent spring portions extending between positions A and B, however, owing to the link and sprocket rotational engagement and the angular approach of points 16 and 17 coinciding with the opposite sides of angle $2\theta$, are under an endwise compressive stress and are thus opposing the link engagement with a radial force component of the spring endwise stress.

It will be seen that a substantially continuous spring structure, applied to pivoted link chain members as described above, will initially hold them in resilient, substantially colinear alignment. The spring members thus oppose a spring force to the potential impact when link engagement with a drive sprocket bends the spring portions out of their initial alignment. It should further be noted, in Fig. 2, that the spring force opposing the rotational engagement phase of each link with the sprocket E, is also effectively supporting the link BC, and thus the drive strand of the chain, in its approach to the sprocket, maintaining it at a substantially constant drive radius thereon. The chain and link action described can be followed in detail by considering in Fig. 2, the action of link member 21, extending between the pivot centers designated B and C, when engaging the sprocket, starting from the position shown in Fig. 2. It will be noted that engagement of the spring supported link BC commences at B and that the initial line of engagement BCF, is tangent to the sprocket pitch circle instead of subtending it as in the preceding diagram. In the position shown, link BC is supported by the portion of spring member S, extending between B and C. As engagement continues, the resisting spring force on BC increases in direct proportion to the increasing link angle relative to the preceding link, maintaining the link pivot center C, and consequently the line of the drive strand, substantially tangential to the pitch circle. Under these conditions the link pivot center C continues along the line CB to the point of tangency at B, on the sprocket and the rotation of the link about pivot center B is limited to angle $\theta$, while the sprocket rotates through angle $2\theta$, as before. Supported by the spring member S the links thus rotate through only half the former angular distance and at half the relative angular speed of the sprocket. Considered in similar terms, and in comparison with the conditions in Fig. 1, the linear speed of C along the arc CD, relative to the sprocket, is equal to the linear speed of a point on the sprocket at a distance $P/2$ from the sprocket center O. Substituting $(P/2)^2$ for $P^2$ in Equation 1, the energy of potential impact in foot-pounds will be $$\frac{w(P/2)^2 n^2}{845{,}617} \qquad (2)$$

or, since the impact is now proportional to the square of the reduction in relative link velocity, only one-fourth that of the chain and sprocket combination in Fig. 1.

If this improved link action is further considered in the light of the foregoing analysis, the potential impact may be found to be even less than that given by Formula 2. This will be apparent from consideration of Fig. 3, which shows the link extending between positions B and C at the mid-point of its engagement phase after starting from the position in Fig. 2. It will be seen that at this position the link has completed three-fourths of its rotational engagement while the sprocket has rotated through angle $\theta$, equivalent to half the angle required for full link engagement. Hence, during the second half of the engagement phase, when the sprocket again rotates through angle $\theta$, the effective angular speed of the link BC is only one-fourth that of the sprocket and, again in terms of the foregoing values, the linear speed of C along the arc CD, relative to the sprocket, is reduced to the linear speed of a point on the sprocket at a distance $P/4$ from the sprocket center O, as indicated in the diagram, Fig. 3. Substituting $(P/4)^2$ for $P^2$ in Equation 1, the energy of potential impact in foot-pounds will then be $$\frac{w(P/4)^2 n^2}{845{,}617} \qquad (3)$$

or substantially one-sixteenth that of the chain and sprocket combination in Fig. 1, it being understood that this equation does not purport to provide other than a simplified comparative expression for the impact condition, in terms of the well-known analysis referred to above.

It can now be observed that the fundamental difference and improvement in chain action embodied in this invention resides substantially in the fact that, other things being equal, the effective angle of link rotation is practically halved, the impact may be reduced to at least one-sixteenth of its potential value, and periodic displacement of the drive strand in the plane of rotation may be virtually eliminated, by spring loading the chain in the manner indicated.

In practice there will, of course, be a slight displacement of the strand owing simply to its resilient support by the spring members controlling the engagement action. It will be substantially less than without the controlling spring, however, and the resilient support will be of additional value in absorbing the residual speed and drive torque fluctuations experienced with most chain drives. The effective spring force, as already noted, varies directly with the link angle or deflection, and is thus of maximum benefit on the smaller drive sprocket tooth numbers. This is entirely favorable, for although the conventional analysis, used above, assumes the impact condition to be independent of the number of sprocket teeth, practical experience indicates that it is relatively much worse on the smaller sprockets.

Figures 4, 5:
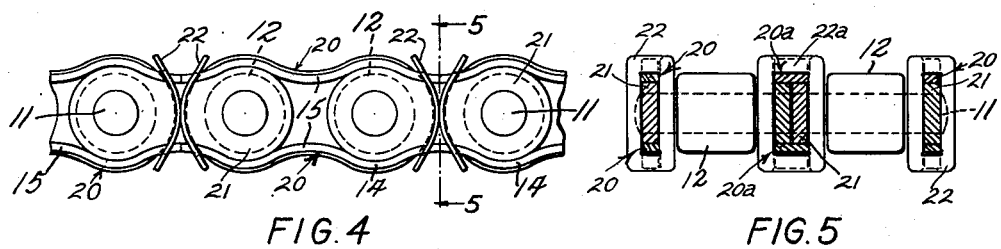
Fig. 4 is a side elevational view of a typical roller chain embodying the present invention.
Fig. 5 is a transverse sectional view on the line 5—5 of Fig. 4.
Figures 6, 7:
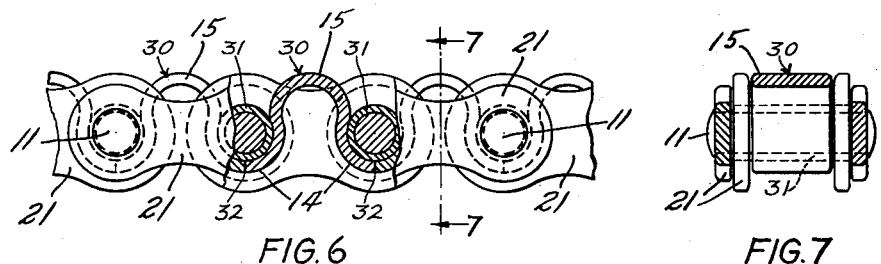
Fig. 6 is a partly sectioned side elevational view of a modified roller chain embodying the present invention.
Fig. 7 is a transverse sectional view on the line 7—7 of Fig. 6.
Figures 8, 9:
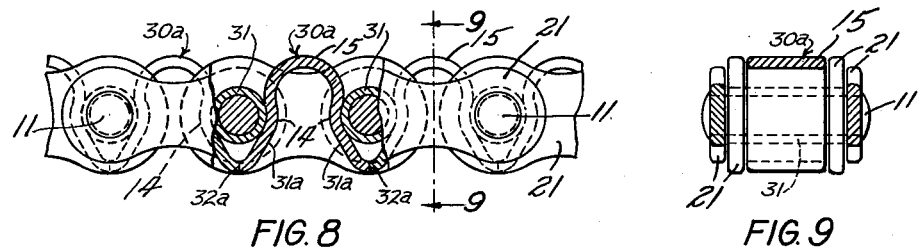
Fig. 8 is a partly sectioned side elevational view of a modification of the embodiment shown in Fig. 6.
Fig. 9 is a transverse sectional view on the line 9—9 of Fig. 8.

Figs. 4 to 11 are presented to show further embodiments of this invention, as diagrammatically presented in the foregoing part of this specification, and as applied to representative types of drive chains in wide use, it being understood that the principle is broadly applicable to any and all types of pivoted link chains used for conveying and power transmission purposes and that the spring members may have any shape suited to the requirements set forth herein. The attachment of spring members to a standard double row roller chain structure is shown in Figs. 4 and 5. Reference numeral 20 generally designates spring members of rectangular cross-section, attached to the chain for opposing the link rotational impact and supporting the drive strand at a substantially constant tangent to the sprocket. As shown in the side elevational view, Fig. 4, the spring members are provided with curved portions 14, substantially concentric with each link pivot member 11, and intermediate curved portions 15, extending between each concentric portion and conforming to the curved outline of alternate link members 21. The spring members extend along the top and bottom edges of the links over two or more pitch distances, bridging the space between adjacent link ends. The curved portions bridging these spaces accommodate link articulation in either direction by longitudinal extension or compression, as the links pivot into engagement on a drive sprocket. The lateral width of the spring members is conveniently made equal to the link plate thickness and the springs are secured to the narrow parts of the links 21, between the pivot centers, with any convenient retaining means such as designated by numeral 22. These retaining means comprise arcuate rectangular collars, preferably also made of spring steel, having apertures equal in projected area to the combined sectional area of the assembly at the retaining positions. The area of the apertures is made sufficient to permit passage of the collars over the large ends of the links 21 when temporarily flattened for this purpose. As shown in Fig. 4 the collars are assembled in convexly opposed pairs to conform to the clearance between adjacent ends of the inside links. The opposed ends can then be pressed together to provide clearance for assembling the spring members on the edges of the links 21.

As will be apparent from reference to Fig. 5, transversely adjacent links 21 of each row, in multiple-width chains of this type, provide a double width edge for mounting the spring members, and for such positions the latter, as well as the securing collars, are conveniently made in double unit widths, as 20a and 22a, respectively. This method of mounting the spring members is advantageously adapted to both single and multiple-width roller chains in that it does not encroach on the normal sprocket tooth working clearances, or exceed the projected overall dimensions, and the chain is thus left free for equally effective engagement on either or both sides in a given drive.

Only one side of the roller chain is required to engage the sprockets in the majority of drives, however, and its ability to drive on either side is thus of limited advantage. Furthermore, the rolling action of the chain rollers when engaging a sprocket tooth is acknowledged to be of little value, their principal duty being to provide a bearing seat for the pivot members when engaging the sprocket.

The basic roller chain construction therefore lends itself particularly well to the simple modifications embodying this invention illustrated in Figs. 6 to 9, inclusive. In these examples the chain rollers are advantageously replaced by spring members which additionally incorporate the essential roller function of providing a bearing seat for the pivot members when engaging the drive sprocket. As shown in the sectioned part of Fig. 6 these spring members, generally designated by reference numeral 30, are formed with a relatively large curved center portion 15, extending at each end to oppositely curved portions 14, concentric with the pivot members 11 and 31, and constituting bearing seats for these pivot members. The curvature of the center portion 15, additionally provides a clearance space for the sprocket tooth engagement. These spring members are preferably formed from material of the same thickness and width as used for the rollers they replace, in order to preserve the standard sprocket tooth working clearances. The maximum diameter of the curved center portion 15, is made slightly larger than the linear clearance between adjacent link pivot members 31, and the resilient properties of the member are utilized to spring it into position and ensure its positive retention on the chain between additionally colinear pivot members. When assembled in this manner the ends of adjoining spring members, comprising the pivot bearing seat portions 14, abut at the pivot members as indicated by numeral 32, ensuring transference of the spring deflection force between adjacent members as each link rotates into engagement on a sprocket, bringing adjacent points 32, 32 closer to each other and thus compressing the spring members 30. The functions of both spring control of the chain action and the provision of bearing seats for the pivot members when engaging the sprocket, are thus economically and efficiently combined.

The embodiment of this invention described immediately above can be further modified to provide the basic roller chain construction with an advantageous feature of inverted tooth chains. As is well known, the inverted tooth or so-called "silent chain" achieves somewhat quieter and more durable operation by virtue of a link form giving a larger engagement contact area with the sprocket teeth although, as already noted, it is subject to the same dynamic limitations as the roller chains. The modified spring members incorporating this feature are shown attached to the chain illustrated in Figs. 8 and 9. Initially colinear spring members generally designated 30a, substantially identical in principle and function with those in Figs. 6 and 7, having curved center portions 15 and curved pivot bearing portions 14, are provided with straight end portions 31a, 31a extending from each bearing portion to provide a desirably increased contact area for engaging the sprocket teeth. These end portions may be formed with any convenient included angle and as shown in the sectioned part of Fig. 8, the extreme ends may recurve to abut squarely as at 32a, or they may alternatively be extended to a relatively pointed abutment if desired. When engaging a drive sprocket, as illustrated diagrammatically in Figs. 2 and 3, the abutting ends 32a, of the initially colinear spring members will be forced closer together by the link engagement rotation. This compresses the curved spring portions 15, generating the spring force which opposes the link rotation and reduces potential impact with the sprocket.

Figures 10, 11:
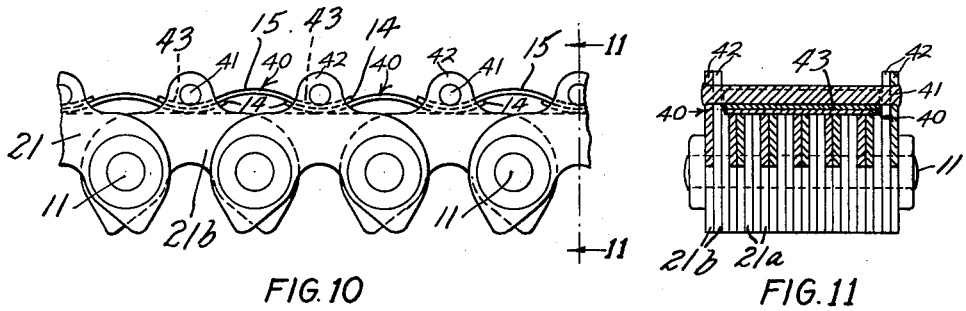
Fig. 10 is a side elevational view of a typical inverted tooth chain embodying the present invention.
Fig. 11 is a transverse sectional view on the line 11—11 of Fig. 10.

Figs. 10 and 11 illustrate an application of the principle of this invention to a typical inverted tooth chain structure. Transversely corrugated flat spring members generally designated 40, which may be either continuous or in short lengths with curved center portions 15 and reversely curved end portions 14, overlapped as shown in Fig. 10, are arranged on the back of initially colinear chain link members 21a, with the overlapped end portions 43 passing under transverse retaining pins 41, extending between lugs 42 integral with the outside link members 21b at each side of the chain. The curves in the spring members 40, are given sufficient length to accommodate by extension the required relative link angle when engaging the smallest allowable drive sprocket. As described for the preceding embodiments of this invention, when the chain engages a sprocket the rotational engagement of the links bends the spring members 40 out of their initial colinear alignment, producing a spring force which opposes the link motion and effectively suppresses impact with the sprocket.

It is to be understood that the forms of this invention herewith shown and described are to be taken as preferred examples of the same, and that various changes in the shape, size and arrangement of parts may be made within the province of this disclosure. The spring members, for example, may advantageously be formed in continuous lengths if manufacturing convenience permits and may comprise a plurality of layers, while chains of the type shown in Figs. 10 and 11 may have spring members substantially of the form shown in Figs. 8 and 9, inserted between the adjacent ends of the link members and numerous such modifications may be resorted to without departing from the spirit of the invention or the scope of the appended claims.

I claim:

1. In a chain drive having a drive sprocket or wheel characterized by a plurality of teeth at its engagement pitch circle and a chain having a plurality of pivoted link members adapted to engage the teeth of said sprocket at said pitch circle and having a drive strand center line defining the direction of chain travel in relation thereto; the combination of a plurality of spring members engaging said link members and cooperating therewith, the spring tension and direction of application thereof being such as to hold the pivot center of each link and its following drive strand on a center line substantially tangent to said sprocket pitch circle during all phases of pivotal engagement of a link with a tooth of said sprocket.

2. In a chain drive having a sprocket characterized by a plurality of teeth at its engagement pitch circle and a chain having a plurality of pivoted link members adapted to engage the teeth of said sprocket at said pitch circle and having a drive strand center line defining the direction of chain travel in relation thereto; the combination of a plurality of spring members and clamps for holding said spring members against the links of said chain for cooperation therewith, the spring tension and direction of application thereof being such as to hold the pivot center of each link and its following drive strand on a center line substantially tangent to said sprocket pitch circle during all phases of pivotal engagement of a link with a tooth of said sprocket.

3. In a chain drive having a sprocket characterized by a plurality of teeth at its engagement pitch circle and a chain having a plurality of pivoted link members adapted to engage the teeth of said sprocket at said pitch circle and having a drive strand center line defining the direction of chain travel in relation thereto; the combination of a plurality of sheet metal spring members sprung between said link members and cooperating therewith, said spring members being between the link members and the teeth of said sprocket when engaged, the ends of successive spring members meeting for the development of lifting forces holding the pivot center of each link and its following drive strand on a center line substantially tangent to said sprocket pitch circle during all phases of pivotal engagement of a link with a tooth of said sprocket.

4. In a chain drive having a sprocket characterized by a plurality of teeth at its engagement pitch circle and a chain having a plurality of pivoted link members adapted to engage the teeth of said sprocket at said pitch circle and having a drive strand center line defining the direction of chain travel in relation thereto; the combination of a plurality of spring members spanning said links, ears on said links and auxiliary cross bars extending therebetween and holding the sides of said spring members against said links, the spring tension and direction of application thereof being such as to hold the pivot center of each link and its following drive strand on a center line substantially tangent to said sprocket pitch circle during all phases of pivotal engagement of a link with a tooth of said sprocket.

5. In a chain drive according to claim 1, a detachable link impact reducing member for pivoted link drive chains comprising a mechanical spring element with a curved center portion shaped for resiliently sprung insertion and self-retention between adjacent chain pivot members, and curved end portions shaped to engage said pivot members and resiliently abut curved end portions of adjacently assembled spring elements.

6. In a chain drive according to claim 1, a pivoted link drive chain comprising link members of curvilinear outline having spring members attached thereto to reduce its engagement impact with a drive wheel, said chain having spring members comprising initially colinear curvilinear spring portions and shaped to engage curvilinear outline portions of adjacently colinear link members, and having clamps holding said spring members thereon, said spring members further being shaped and arranged to hold the link members in said initially colinear alignment and resiliently oppose their rotational engagement with a drive wheel.

7. In a chain drive according to claim 1, a pivoted link drive chain having spring members attached thereto to reduce its engagement impact with said drive wheel, said spring members comprising an initially colinear series of curved spring portions extending between reversely curved end portions of a spring, each of said end portions engaging a link pivot center of said chain and abutting an end portion of an adjacently colinear spring member, said abutting spring members comprising a substantially continuous spring structure, the spring tension and direction of application thereof holding each link pivot center substantially tangent to the engagement pitch circle of said drive wheel during all phases of the link pivotal engagement therewith.

8. In a chain drive according to claim 1, a pivoted link drive chain having a spring member attached thereto to reduce its engagement impact with a drive wheel, said spring member comprising a substantially continuous length of corrugated material with corrugation portions extending between each pivot center of said chain alternating with corrugation portions concentric with said pivot centers, said corrugations being shaped to initially hold the link members of said chain in resilient colinear alignment and oppose rotation of the link members out of said initially colinear alignment when engaging a drive wheel.

9. In a chain drive according to claim 1, a pivoted link drive chain having spring members attached thereto to reduce its engagement impact with a drive wheel, said chain comprising initially colinearly aligned link members and oppositely aligned link lug portions with pin members extending transversely between said lug portions and said spring members comprising curvilinear spring portions arranged end to end with overlapping end portions engaging said pin members and resiliently holding the link members in said initially colinear alignment.

10. In a chain drive according to claim 1, a pivoted link drive chain having spring members attached thereto to reduce its engagement impact with a drive wheel, each of said spring members having a curved center portion shaped for sprung insertion and resilient retention between adjacent pivot members of the chain and reversely curved end portions shaped to engage said pivot members and resiliently abut reversely curved end portions of adjacently assembled initially colinear spring members, the spring force of said abutting portions maintaining adjacent link members in said initially colinear alignment and resiliently opposing rotation of said link members out of said alignment.

11. In a chain drive according to claim 1, each of said spring members comprising a substantially continuous length of corrugated material with corrugation portions extending between each pivot center of said chain alternating with corrugation portions concentric with said pivot centers, said spring members being shaped and arranged to hold the drive line of said pivot centers of said chain tangent to said pitch circle when engaging said drive sprocket.

12. In a chain drive according to claim 1, each of said spring members having curved center and end portions shaped for sprung insertion and resilient retention between adjacent pivot members of said chain and extensions of said end portions shaped to abut each other and resiliently engage the teeth of said sprocket, the tension of said spring members and the direction of application thereof being such as to hold each link pivot center on a drive center line substantially tangent to said sprocket tooth pitch circle during all phases of link pivotal engagement therewith.

13. In a chain drive according to claim 1, said plurality of spring members comprising a substantially continuous corrugated structure with corrugation portions in resiliently sprung insertion and retention between each pivot center of said chain alternating with corrugation portions concentric with said pivot centers adapted to resiliently engage the teeth of said sprocket.

14. In a chain drive according to claim 1, a detachable impact reducing spring member for pivoted link drive chains comprising a mechanical spring element having a curved center portion shaped for sprung insertion and resilient retention between adjacent chain pivot members and curved end portions shaped to resiliently abut curved end portions of adjacently assembled spring members and engage drive sprocket teeth.

15. In a chain drive according to claim 1, a detachable impact reducing spring member for pivoted link drive chains comprising a substantially continuous length of corrugated spring material having corrugation portions extending between adjacent link pivot members alternating with corrugation portions concentric with said pivot members.

16. In a chain drive according to claim 1, a detachable impact reducing spring member for pivoted link drive chains comprising corrugated spring portions shaped for sprung insertion and resilient retention between adjacent chain pivot members alternating with corrugation portions shaped to engage drive sprocket teeth.

WILFRID H. BENDALL.

References Cited in the file of this patent

UNITED STATES PATENTS

| Number | Name | Date |
|---|---|---|
| 615,203 | Woodcock | Nov. 29, 1898 |
| 1,090,380 | Brampton et al. | Mar. 17, 1914 |
| 1,183,718 | Best et al. | May 16, 1916 |

FOREIGN PATENTS

| Number | Country | Date |
|---|---|---|
| 12,985 | Great Britain | May 27, 1914 |